June 8, 1943.  H. D. MADDEN ET AL  2,321,224
MANUFACTURE OF ELECTRIC TUBES
Filed Oct. 12, 1938  3 Sheets-Sheet 1

INVENTORS
H. D. MADDEN
J. W. GREENBOWE
BY
J W Greenbowe
ATTORNEY

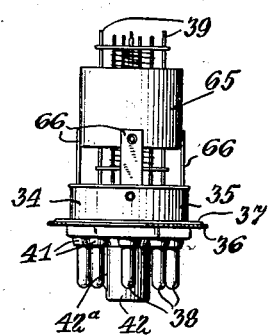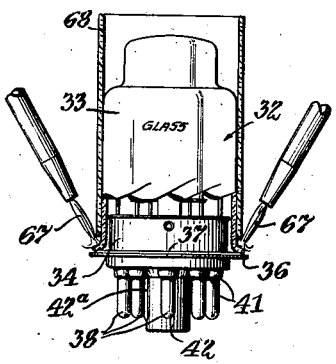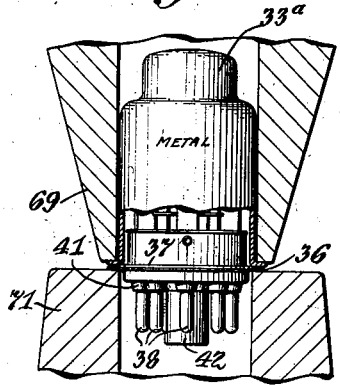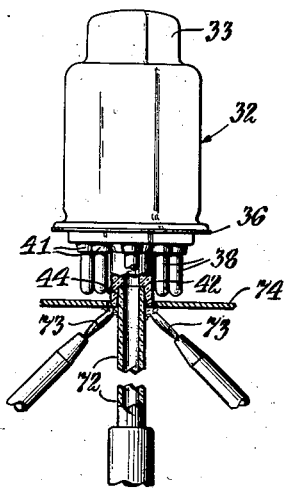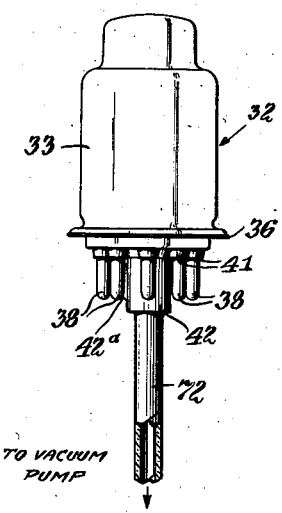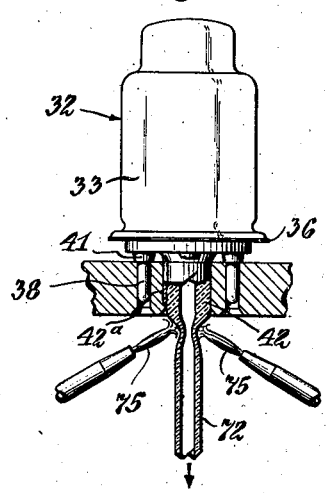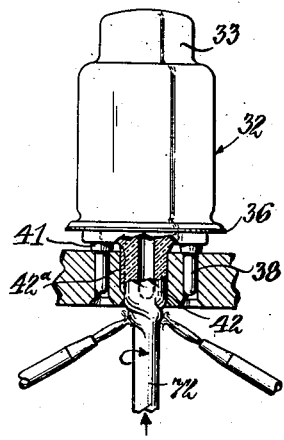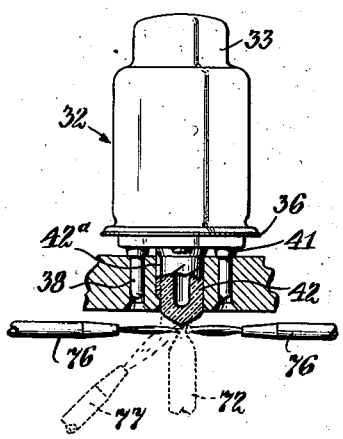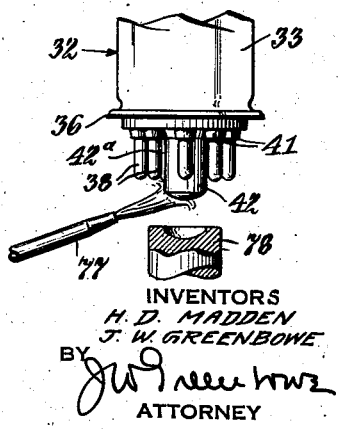

June 8, 1943.   H. D. MADDEN ET AL   2,321,224
MANUFACTURE OF ELECTRIC TUBES
Filed Oct. 12, 1938   3 Sheets-Sheet 3
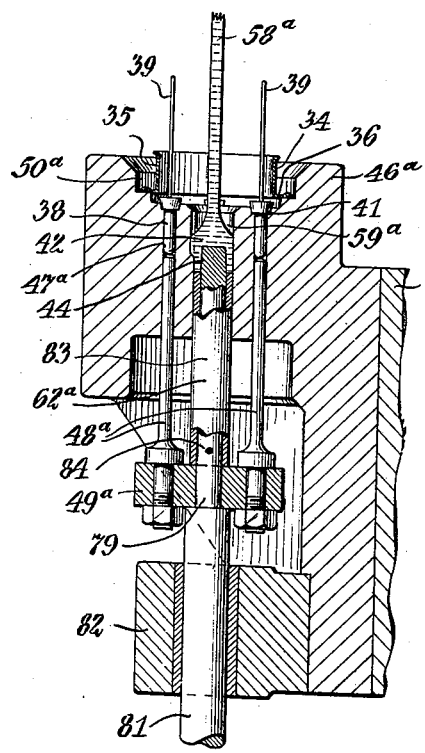
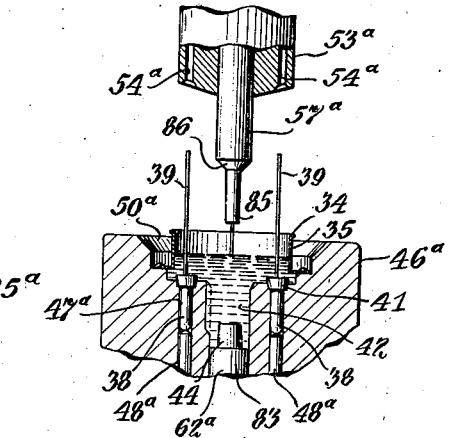
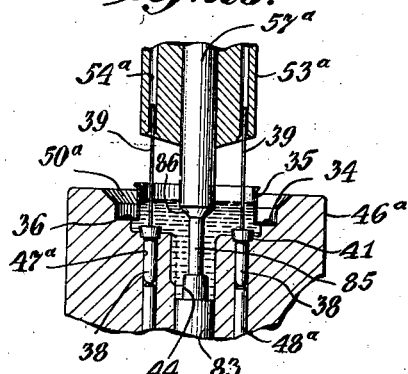
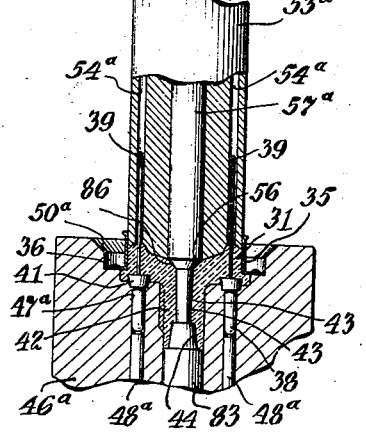
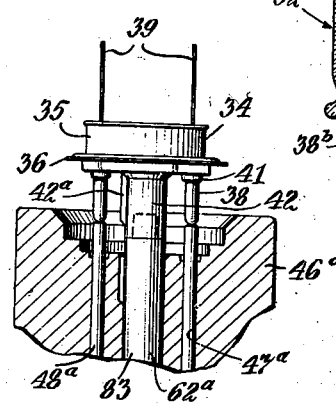
INVENTORS
H. D. MADDEN
J. W. GREENBOWE
BY
ATTORNEY Patented June 8, 1943

2,321,224

UNITED STATES PATENT OFFICE 2,321,224

MANUFACTURE OF ELECTRIC TUBES

Harry D. Madden, South Orange, and James W. Greenbowe, Newark, N. J., assignors to Westinghouse Electric & Manufacturing Company, East Pittsburgh, Pa., a corporation of Pennsylvania Application October 12, 1938, Serial No. 234,594

23 Claims. (Cl. 250—27.5)

This invention relates to the manufacture of electronic tubes and, more particularly radio tubes and bases for such devices.

One of the objects of our invention, is the manufacture of tubes and, more especially, radio tubes, by a process in which molten glass is caused to flow around the prongs or terminal posts for such devices, while positioned in a suitable mold, after which the mold is opened, the base withdrawn, electrodes secured thereto, and an envelope sealed thereover.

Another object of our invention is the manufacture of electronic tubes employing an upper mold element having prong-holding apertures through which the ends of terminal posts or conductors extend, to facilitate a stripping operation, said posts being consolidated with a glass base portion by pouring molten glass into a lower mold element through said upper mold element whereby inner portions of said posts become firmly embedded therein.

A further object of our invention is the provision of a mold for forming bases for electric tubes, and, more especially, radio tubes, in which a stationary upper mold element is provided, and a lower mold movable on the end of an actuating rod is formed with apertures receiving the inner ends of lead-in conductors depending from terminal posts secured in said upper mold element.

A still further object of our invention is the provision of a mold for forming radio tube bases of glass, which mold comprises upper and lower elements, said upper element being stationary, said lower element reciprocating into and out of cooperative relationship with said upper mold element, and an ejection or stripper member provided on the end of a rod, which reciprocates to engage the ends of terminal posts of bases which have been formed in said mold, and forces them out of the upper mold element after the glass has hardened therearound.

An additional object of our invention is the provision of a mold for manufacturing electric tubes and, more particularly, the bases for radio tubes, in which the upper mold element has an aperture through which the molten glass passes, terminating in means such as a funnel adapted to serve for guiding glass thereinto and cutting it off at the proper time, when one mold passes from under the stream of flowing glass to make way for the adjacent mold.

Another object of our invention is the provision of a mold for manufacturing radio tubes, said mold comprising upper and lower portions, the upper portion receiving the prongs or terminal posts for such bases and having an aperture through which molten glass flows to said mold, a duplex plunger device being provided to differentially reciprocate in said aperture, to first engage the lower mold to form an exhaust opening, and then press into the upper portion of the glass around said opening to form a socket for receiving an exhaust tube.

Other objects and advantages of the invention, relating to the particular arrangement and construction of the various parts, will become apparent as the description proceeds.

Referring to the drawings.

Figure 7:
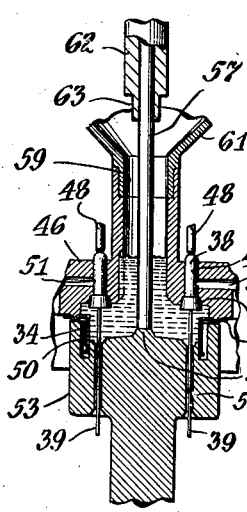
Figure 7 is a fragmentary view corresponding to Figure 6, but showing the position where the mold has been filled with molten glass to the desired extent, the inner element of a duplex plunger having been depressed to engage the lower mold element, in order to form an exhaust tube aperture, and the outer element of said plunger moving downward into position.
Figure 8:
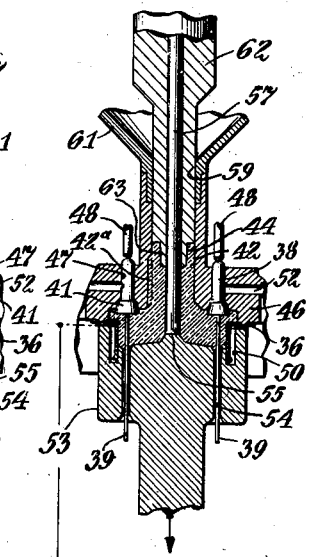
Figure 4:
Figure 4 is an elevational view, partly in axial section, of a metal ring, which may be formed of "Kovar" or other material having approximately the same coefficient of expansion as the glass sealed thereto, which is used as a part of the base, illustrated in Figures 1, 2 and 3.

Figure 8 is a fragmentary view corresponding to Figure 7, but showing a subsequent position where the outer plunger element has actually engaged the molten glass and formed the exhaust tube socket therein, the arrow on the lower end of the lower mold element showing the next move of said element, and the dotted position of the base illustrated therebelow, showing how the lower mold element carries the molded base downward until the edge of the metal ring, forming a part thereof, engages a surrounding stripper member and removes said base from the lower mold element.

Figure 9 is an elevational view of the base after the electrodes have been mounted on the inner leads or supports, including the anode which is secured to the metal ring of the base.

Figure 10 is a view of the base and electrodes, as in Figure 9, but showing the glass envelope positioned over the electrodes, and its lower edge engaging the metal ring of the base, in the process of being heated and sealed thereto.

Figure 11 is a view corresponding to Figure 10, but showing the position of the parts for forming a modification, in which the envelope is of metal rather than glass, and the lower edge of which is to be welded to the outer peripheral portion of the metal base ring.

Figure 12 is an elevational view showing the position of the parts during the process of sealing the exhaust tube to the base, a portion of said tube and the engaged portion of said base being illustrated in axial section.

Figure 13 is a view corresponding to Figure 12, but showing a subsequent position in which the tube is being exhausted.

Figure 14 is a view corresponding to Figure 13, but illustrating the beginning of the tipping-off operation on the exhaust tube.

Figure 15 is a view corresponding to Figure 14, but showing the next position in which the exhaust tube is being twisted and pushed upwardly to facilitate the tipping-off operation.

Figure 16 is a view corresponding to Figure 15, but showing the final tip-off position.

Figure 17 is a view of the next position, after the exhaust tube has been removed, and showing the final shaping plunger for the exhaust stub beneath the tube.

Figure 6:
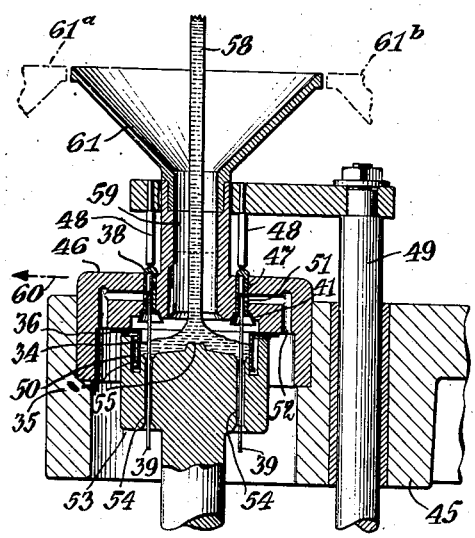
Figure 6 is a vertical sectional view of the mold and associated apparatus, adapted for forming bases such as illustrated in Figures 1, 2 and 3, the upper and lower mold elements being there shown in cooperative relationship, and a stream of molten glass being illustrated in the process of filling the mold.

Figure 18 is a view corresponding to Figure 6, but showing a modified form of apparatus for making radio tube bases.

Figure 19 is a fragmentary view corresponding to Figure 18, but showing the position after the lower mold has been supplied with the desired quantity of glass, and an upper mold and associated plunger is in the process of descent.

Figure 20 is a view corresponding to Figure 19, but showing a subsequent position in which the plunger has actually descended into the molten glass to form the exhaust aperture, and the upper mold is approaching the upper surface of the glass.

Figure 21 is a view corresponding to Figure 20, but showing a subsequent position in which the upper mold element has actually passed within the metal mold ring and engaged the upper surface of the glass to form it to the desired contour.

Figure 22 is a view of a subsequent position in which the upper mold element and associated plunger have been withdrawn, and the formed base ejected from the lower mold element.

Figure 23 is a vertical sectional view of the formed base, after the associated envelope has been consolidated therewith.

Figure 1:
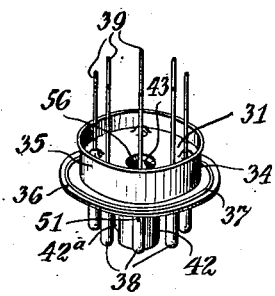
Figure 1 is a perspective view of a radio tube base, embodying our invention, as it emerges from a mold.
Figure 2:
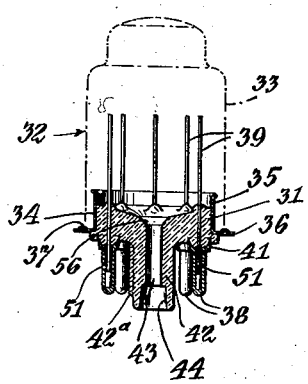
Figure 2 is an axial sectional view of a base, such as shown in Figure 1, with an envelope for the tube diagrammatically shown.

Referring to the drawings in detail, and first considering the embodiment of our invention illustrated in Figures 1 to 5 inclusive, there is shown a base 31 for an electric or radio tube 32, the envelope of which is diagrammatically illustrated in dot-and-dash lines and designated by the reference character 33 in Figure 2. The base 31 is formed of glass and has incorporated therewith an annular ring 34, of "Kovar" or other alloy or metal having a coefficient of expansion closely approximating that of the glass used therewith. For example "Kovar" may be used with hard glass or nickel iron with soft glass. The ring 34 comprises a normally upstanding or generally cylindrical flange 35 encircling the periphery thereof, and an outstanding flange 36 forming a surface for attachment to the envelope 33 and, for that purpose, desirably, but not necessarily, provided with a generally circular upwardly pressed corrugation 37 extending therearound. If desired, the cylindrical flange 35 may be provided with one or more corrugations or depressions to lock the flange to the glass base 31, to prevent endwise relative movement of the flange during withdrawal of base from the mold or from the socket when the device is in use.

Figure 5:
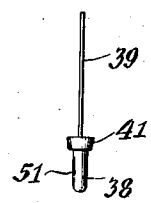
Figure 5 is an elevational view of one of the lead-in conductors, each of which comprises a terminal post with associated lead-in wire or electrode support extending therefrom.

The glass base 31 desirably has incorporated therewith, a plurality of metal posts or contact devices 38, shown in detail in Figure 5, and adapted for cooperation with contact members in a corresponding tube socket, as will be understood. Each post is desirably hollow to receive the outer end of a lead-in conductor 39 which passes through the glass base to connect with an associated electrode, not shown, and a flaring skirt portion 41, the extreme or upper edge of which is relatively sharp and embedded in the glass base 31, thereby making the terminal post 38 relatively rigid in its relationship with said base. The envelope 33 may be of glass or metal and is desirably secured to the base or metal ring portion 34 in a manner which will be described in detail hereinafter.

The glass base 31 has an exhaust tube stub 42 desirably formed when the parts of the base are consolidated in a mold, said stub 42 having an aperture 43 therethrough terminating in a socket 44 for the reception of an exhaust tube. The stub 42 not only serves for connection with an exhaust tube, but constitutes a guide to fit an aperture of a socket. The stub or guide, for this purpose, is provided with a boss or ridge 42ᵃ which enters a slot provided in the wall of the aperture receiving the guide, thus properly locating the contact pins for entrance into their contact apertures.

Figure 3:
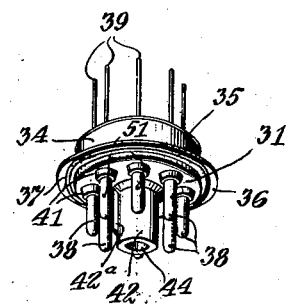
Figure 3 is a perspective view of the base illustrated in Figure 1, but looking diagonally at the lower surface, or that from which the contact prongs extend, rather than at the upper surface, or that from which the inner leads or electrode supports extend.

Figures 6, 7 and 8 illustrate a preferred form of apparatus for molding a base such as shown in Figures 1, 2 and 3. The reference character 45 designates a table or support holding an upper mold element 46, which may be relatively fixed against vertical movement, but movable horizontally with its associated parts. Said upper mold element 46 is desirably formed of steel or similar material and has a plurality of vertical apertures 47, adapted to snugly receive a corresponding number of terminal posts 38, as shown in Figure 5, with their associated leads or supports 39 extending downwardly therebelow. The apertures 47, by extending entirely through the mold element 46, desirably permit the outer ends of the posts 38 to extend above the upper or outer surface of the upper mold element 46, and allow for engagement therewith of a stripping device comprising depending prongs 48 carried by and movable with a reciprocating member 49, which may be movably carried by the table or support 45, as shown most clearly in Figure 6.

In order to prevent entrapment of air in the upper mold during molding of glass therein, each hollow terminal post 38 desirably has an aperture 51 which, when the post is in position, communicates with a registering port 52 in the upper mold element 46 in order to allow for the escape of air, as molten glass rises in the mold. The sharpened skirt portion 41 of each terminal post 38 desirably extends into the molding space below the upper inner substantially flat and normally horizontal surface of the upper mold 46, in order to become embedded and sealed in the glass base portion during the process of formation.

Associated with said upper mold portion 46 is a lower mold portion 53, also desirably formed of steel or similar material. The mold portion 53 is desirably vertically movable into and out of cooperative relationship with the upper mold element 46, and has an annular socket 50 receiving the generally cylindrical portion 35 of the metal ring 34, if such a ring is to be incorporated in a radio base to be formed. The flange 36 of said ring 34 engages the upper surface of said portion 53. The mold portion 53 is provided with apertures 54 registering with the post apertures 47 and adapted to receive the lower or inner ends of the conductors 39 extending therefrom. The upper inner surface of the lower mold 53 has a contour corresponding with that desired for the normally upper surface of the base or other device to be formed therein. In the present instance, while its upper surface is substantially flat and normally substantially horizontal, as illustrated, although it may slope slightly to facilitate molding operations, there is an upwardly extending boss 55 provided thereon, for the purpose of forming a corresponding funnel shaped portion 56, communicating with the exhaust aperture 43 in the exhaust stub portion 42 of the base, and an abutment for a cooperating plunger member 57 which makes the aperture 43.

The mold previously described may be used separately or comprise one of a series of molds to be successively filled by a stream of molten glass 58 under which they move, one by one. If one of a series, the upper mold element 46 is not only apertured, as indicated at 59, to receive the stream of glass 58, but also has associated therewith a funnel-shaped portion 61, which serves to direct the glass into the aperture 59, from whence it goes to the associated mold elements 46 and 53, and initiate and cut-off the flow of glass into the particular mold under consideration, after the preceding mold and its associated funnel 61ª has passed therefrom, by movement in the direction of the arrow 60. Eventually the mold and its funnel 61 will pass from beneath the stream of glass 58, and the latter will be caught by the subsequent funnel 61ᵇ and directed to its associated mold, as will be understood.

In order to accurately predetermine the amount of glass fed to the lower die or mold element 53 through the funnel 61, we preferably cause the stream of glass 58 to issue from a glass melting furnace, not shown, through an orifice provided with a die, not shown, which die, however, is preferably formed of an alloy of platinum and rhodium such as described in Patent No. 2,031,083, dated February 18, 1936.

The temperature of the stream is desirably maintained uniform by sighting a radiation pyrometer, not shown, thereon, and controlling the heat of the furnace by means of apparatus such as described and claimed in Patent No. 2,116,450, dated May 3, 1938, so that an accurately controlled amount of glass, just sufficient to fill the mold to the desired extent, is fed thereto as it passes under the stream 58.

In order to make the base-forming operation continuous, the mold, comprising the main elements 46 and 53 and associated apparatus, is merely one of a series, and the elements of said series are each caused to move under the stream of glass, one by one, to receive the charge required and then pass on to make way for the next mold, in a manner such as described and claimed in the co-pending application of Richardson et al., Serial No. 205,180, filed April 30, 1938, and owned by the assignee of the present application. When the glass has filled the lower mold element 53 and risen to the proper level in the upper mold element 46, after surrounding and wetting intermediate portions of the leads 39, wetting the inner and part of the top surface of and consolidating with the metal ring 35, and wetting and uniting with the depending skirt portions 41 of the terminal posts 38, it is cut off by moving the mold from thereunder, as previously described, or in any other desired manner, and the plunger 57 then caused to descend thereinto until it engages the boss 55, as shown most clearly in Fig. 7. This forms the exhausting aperture 43 through the base 31 and causes a rise in the glass level corresponding to that indicated in Fig. 7.

The next operation is illustrated in Fig. 8, where the outer, hollow or annular element 62 of the duplex plunger device is shown as having descended, while the inner element 57 remains stationary, to the position shown, thereby forming the socket 44 in the base 31 by the reduced extension 63 on the lower end of the plunger 62.

The next step in the process of making the base, after allowing the molten glass to cool sufficiently to become rigid, is to cause the stripper device 48—49 to move downward simultaneously with the downward movement of the lower die element 53, and with or without some simultaneous downward movement of the plunger 62, thereby removing the formed base from the upper die element 46, and carrying it down with the lower die element 53, until the outwardly extending flange 36 of the metal ring 34 engages the upper edge of the hollow stripper member 64 into which the lower die element 53 passes, thereby separating the molded base from said lower die element.

Fig. 9 shows how the base 31, formed as previously described, looks when the associated anode 65 has been mounted on the cylindrical flange portion 35 of the metal ring portion 34 of said base, as by means of metal plates 66 riveted to the connected parts, and the leads 39 have been connected to filament, grid, and other associated electrodes which may form part of the complete radio tube.

Referring now to Fig. 10, we find there a glass envelope portion 33 applied so that its lower edge engages the outer portion or edge of the outstanding flange portion 36 of the metal ring 34, so as to be consolidated with it, and the corrugation 37 thereon, if used, as by means of fires 67, while the main portion of the envelope is shielded by a hollow cylindrical member 68 formed of asbestos, metal or other suitable material. It is also contemplated to utilize the metallic ring which may be heated by high frequency current, using a suitable coil, to soften the glass and effect a seal.

Fig. 11 illustrates an operation corresponding to that shown in Fig. 10, except that the envelope 33ª is made of metal and is to be welded to the corrugation 37 of the outstanding flange portion 36, while supported as on member 71, by being pressed thereagainst and suitable electric current passed into the joint between associated electrodes 69 and 71.

Fig. 12 shows a subsequent position, applicable to the radio tube of either Fig. 10 or Fig. 11, in which an exhaust tube 72 has its upper end fitted in the socket portion 44 of the exhausting stub 42 for consolidation therewith, as by means of fires 73, while the parts thereabove are protected from undesired heat by means of apertured plate 74 forming a shield.

Fig. 13 is a subsequent view of the tube during the process of exhaust, the exhaust tube 72 being there connected to a vacuum pump or other exhausting means.

In Fig. 14 we illustrate the beginning of the tipping-off operation, where the exhaust tube 72 is being reduced in section by heat from the fires 75, accompanied by a slight stretching.

In Fig. 15 an intermediate tipping-off position is illustrated, where the desired contour on the exhaust stub is provided by preferably giving the exhaust tube a half twist and moving it upwardly to a slight extent to provide the desired amount of glass for closing off the exhaust stub portion and avoiding undesired elongation of the tip.

Fig. 16 illustrates the final tip-off position where the exhaust aperture has been completely closed and the glass restricted by the relatively sharp fires 76. The dotted part shows what portion of the exhaust tube is removed, and the fire 77, shown dotted, represents one for final shaping and annealing purposes after removing the exhaust tube 72.

Fig. 17 illustrates a subsequent operation in which the softened exhaust tube stub 42 is given a final shape, by forcing the shaping die 78 into engagement therewith, to avoid leaving a sharp tip on the end thereof.

Referring now to the embodiment of our invention illustrated in Figs. 18 to 22 inclusive, we show views of apparatus for molding radio tube bases, such as illustrated in Figs. 1, 2 and 3, while the prongs and metal ring portions thereof are supported in positions reversed as compared with those of Figs. 6, 7 and 8. On account of this change in the manner of support during the molding operation, the lower die or mold element 46ª becomes the one provided with a plurality of normally vertical apertures 47ª adapted to snugly receive a corresponding number of terminal posts 38, as shown in Fig. 5, with their associated leads or supports 39 extending upwardly rather than downwardly therefrom.

In the present instance, however, the outer or lower ends of the posts 38 do not extend out of the apertures in the lower mold element 46ª, said apertures, rather serving as guides for the upper or free ends of stripping plungers 48ª secured to a cross-head 49ª, mounted for reciprocation on a plunger 62ª which normally closes the bottom opening 59ª in the mold 46ª.

The plunger 62ª in the present embodiment is formed as a central core 79 extending from an operating shaft 81, reciprocating in a guide 82 carried by the mold-support 45ª, and a sleeve or bushing 83 mounted thereon and secured thereto in any desired manner, as by means of a rivet or pin 84, the core portion 79 normally extending above the sleeve 83, so as to form the socket 44 in the lower end of the exhausting stub 42 of the radio tube base being formed.

In the present instance, there is no need to prevent entrapment of air by the contact posts 38 because of their reversal in position. As in the preceding embodiment, the lower mold element 46ª has an annular depression or socket 50ª receiving the metal ring 34, but in this instance the outstanding corrugated flange portion 36 thereof, allowing the generally cylindrical portion 35 to extend upwardly therefrom around the leads 39.

The socket 50ª desirably has the upper portion flaring outwardly to facilitate entry of the ring or annular metal member 34.

The upper die or mold element 53ª has associated therewith a plunger 57ª which is adapted to reciprocate with respect thereto. The lower portion 85 of said plunger is of the proper size to form the aperture in the exhaust stub 42, by engagement with the top of the plunger core 79 before the molten glass in the mold has solidified.

The lower surface of the upper mold 53ª, when the plunger 57ª is retracted to the position shown in Fig. 21, is supplemented by said plunger, particularly the frusto-conical surface 86 thereof, to form a contour corresponding with that desired for the normally upper surface of the base or other device 31 being formed in the mold. In the present instance, the frusto-conical surface 86 forms a corresponding funnel-shaped portion 56 communicating with the exhaust aperture 43. As in the preceding instance, the upper mold or die 53ª also has apertures 54ª to receive the upper ends of the upstanding leads or supports 39, when the mold sections come into registry as shown in Fig. 21.

The mold just described may be used separately, or comprise one of a series of molds successively filled by a stream of molten glass 58ª under which they move one by one. As one of a series, the upper mold element 53ª has to be moved laterally, out of the way, with respect to the lower mold element while the glass fills the latter to the desired extent, or it has to be moved high enough so that the stream of glass can flow thereunder. No means is disclosed in the present embodiment for initiating and cutting-off the supply of glass flowing into the lower mold element 46ª, but it will be understood that this may be done in any desired manner, or as disclosed in connection with the first embodiment.

It will also be understood that the glass desirably flows from a platinum-rhodium die, its temperature is controlled, and the molds, as a series, may be handled substantially as described in connection with the preceding embodiment, with the exception that allowance has to be made for the fact that the upper mold is not apertured for the passage of a stream of molten glass therethrough.

The mode of operation, using the apparatus of Figs. 18 and 22, inclusive, may be as follows.

Glass is allowed to flow into the mold 46ª from the stream 58ª, while the parts are disposed as illustrated in Fig. 18, until it rises to the desired level, as indicated in Fig. 19.

Fig. 19 represents the condition when the lower mold and a ring of "Kovar" or other suitable metal 34 has been filled to the desired level indicated. The ring of "Kovar" desirably fits so close in the pocket 50ª, that pouring the molten glass therein will not disturb it. Fig. 19 also represents the position where the plunger 57 is descending toward the molten glass, followed by the upper mold element 53ª, the stream of glass 58ª having been cut off or the mold having been moved from thereunder.

Fig. 20 represents a subsequent position where the plunger 57ª has been moved downwardly into the glass, until the lower end of its reduced portion 85 has engaged the upper end of the plunger 79, in order to form the exhausting aperture in the base, the descent of the plunger causing the level of the molten glass to rise slightly in the lower mold element 46ª.

Fig. 21 shows a subsequent position in which the upper mold element 53ª has descended to engage the upper surface of the molten glass and cause it to rise along the edge and form the desired contour. The parts are held in the position of this figure until the glass has solidified, after surrounding and wetting intermediate portions of the leads 39, wetting the inner and part of the bottom surface of, and consolidating with, the metal ring 34, and wetting and uniting with the upstanding sharp skirt portions 41 of the terminal posts 38.

After sufficient hardening, the molded base may be removed from the die, by first raising the upper die member 53ª independently of the plunger 57ª, so as to separate the molded base from said die element 53ª, and then ejecting the molded base from the lower die or mold element 46ª by the upward movement of the stripper plungers 48ª and 62ª, thereby causing the formed base 31 to be completely raised and removed from the die, as shown in Fig. 22.

Fig. 23 is a view corresponding generally to Fig. 2 except that a modified form of base is illustrated in which the use of a metal ring 34 is dispensed with, the envelope 33ᵇ being united directly with the molded glass base 31ᵇ, provided as indicated in the preceding embodiment with contact posts 38ᵇ having leads 39ᵇ, and an exhaust stub 42ᵇ which, in the present embodiment, is shown completely sealed after exhaustion, and comparing, in this respect, with Fig. 17.

From the foregoing disclosure, it will be seen that we have devised a novel form of glass base for electric tubes and improved forms of apparatus especially adapted for molding such bases, and other similar devices, directly from molten glass, thereby avoiding some subsequent steps usually performed. The bases formed may have incorporated therewith, not only contact prongs and lead-in conductors, but also exhaust tube stubs to which exhaust tubes are readily connected and, if desired, also a "Kovar" or metal ring having an outstanding flange to which an anode may be conveniently connected and/or a glass or metal envelope. If a metal envelope is connected to such a ring, the use of a separate anode may be dispensed with, as the metal envelope, itself, may serve as an anode.

Although preferred embodiments of our invention have been disclosed, it will be understood that modifications may be made, within the spirit and scope of the appended claims.

We claim:

1. The method of making a base for an electrical device, comprising supporting a plurality of terminal posts with associated leads in one of upper and lower mold elements, bringing the other of said mold elements into cooperative relationship with said first mold element with inner lead portions from said terminal posts extending into apertures in said other mold element, introducing a measured quantity of molten glass into the lower of said mold elements so that intermediate portions of said leads and inner ends of said terminal posts are embedded therein, forcing a plunger into said glass until it engages the adjacent surface of said lower mold element, and separating the mold elements in order to withdraw the formed base.

2. The method of making a base for an electrical device, comprising supporting a plurality of terminal posts in one of upper and lower mold elements, bringing the lower of said mold elements carrying a metal ring into cooperative relationship with the upper of said mold elements, with an annular flange of said ring disposed between adjacent surfaces of said elements and inner lead portions from said terminal posts extending into apertures in said lower mold element, introducing a measured quantity of molten glass into the lower mold element through an aperture in said upper mold element, forcing a plunger into said glass until it engages the adjacent surface of the lower mold element, forcing an associated annular plunger into the upper surface of said glass to form a socket for the reception of an exhaust tube, and lowering said lower mold element into a stripping device in order to withdraw the formed base from the upper mold element and separate it from said lower mold element.

3. The method of making a base for an electrical device, comprising introducing a quantity of molten glass into the lower element of a mold through an aperture in an upper mold element, said upper mold element having apertures through which the ends of terminal posts extend, said lower mold element having apertures receiving the inner ends of lead-in wires extending from said posts, each post comprising an outer contact or terminal portion frictionally engaging said upper mold element, and a flared skirt portion having a sharp edge extending beyond the inner surface of said upper mold element, so as to become embedded in the glass, forcing the inner element of a duplex plunger into said glass until it engages the adjacent surface of the lower mold element, forcing the outer element of said plunger into said glass to form a socket for the reception of an exhaust tube, and lowering said lower mold element after the glass has hardened.

4. The method of making a base for an electrical device comprising fitting terminal posts with associated leads in one of super-imposed mold elements so that they are frictionally secured in position, filling the lower of said elements with molten glass until the inner end portions only of said posts and intermediate portions of said leads are embedded therein, forcing a plunger into the glass until it engages said lower mold element to form an exhausting aperture through the base being produced, and separating the mold elements to remove the base therefrom after hardening.

5. The method of making bases for electrical devices comprising frictionally mounting terminal posts for a base in apertures in an upper mold element, reciprocating a lower mold element until it takes a cooperative position with respect to said upper mold element, pouring molten glass into said upper mold element to fill the space between said mold elements, and after the glass hardens lowering said lower mold element, while exerting force on the upper ends of said terminal posts, to eject the molded base from said mold, and continuing downward movement of said lower mold element until the peripheral portion of said base is engaged by a stripping device in order to remove said base from said lower mold element.

6. The method of making bases for electrical devices comprising positioning terminal posts in apertures in a mold element so that associated leads extend inwardly therefrom, mounting a base ring in said mold element in a position where it surrounds said leads, disposing a stripper device so that the outer ends of said posts are engaged, pouring molten glass in said mold element until it rises to a predetermined level in said base ring and covers the inner end portions of said posts and portions of said leads adjacent thereto, moving a plunger downwardly into said glass to form an exhausting aperture therethrough, moving a device surrounding said plunger into engagement with said glass to form at least part of the upper surface thereof, separating said mold elements, and removing said base therefrom.

7. The method of making a base for an electrical device comprising fitting a plurality of terminal posts into apertures in a lower mold element, closing said lower mold element by plunger means having an upper extension adapted to form a socket in said base for receiving an exhaust tube, fitting an annular member in said lower mold element so that it surrounds leads extending from said terminal posts, pouring glass in said lower mold element until it reaches a desired level in said annular member, forcing a plunger into said glass until it engages the upper surface of said extension to form an exhausting aperture through said base, lowering an upper mold element until it telescopes with said annular member to form the upper surface of said base, allowing the glass in said mold to harden, withdrawing said upper mold element while keeping the plunger means therein stationary to eject the formed base therefrom, and raising said base out of said lower mold element.

8. Apparatus for making bases for electrical devices comprising upper and lower mold elements, one of said elements having apertures for frictionally gripping terminal posts and the other having registering apertures through which leads from said posts extend, the lower of said mold elements being formed to receive molten glass, and a plunger reciprocable in said upper mold element to form exhausting apertures through bases produced in said mold elements.

9. Apparatus for making bases for electrical devices comprising upper and lower mold elements, said upper mold element having apertures for frictionally receiving terminal posts and an aperture through which a stream of molten glass may be introduced, said lower mold element being reciprocable into and out of cooperative relationship with said upper mold element, and formed to receive the molten glass and confine it against the upper mold element, said lower mold element also having registering apertures into which leads from said posts normally extend, and plunger means reciprocable in the glass-receiving aperture of the upper mold element, in order to form exhausting apertures in said bases, and means for ejecting formed bases from said mold elements.

10. Apparatus for making bases for electrical devices comprising a lower mold element having apertures for receiving terminal posts, a plunger reciprocable in another aperture into cooperative relationship with said lower mold element, an upper mold element having apertures receiving the upper ends of leads extending from said posts, and plunger means reciprocating in an aperture in said upper mold element to engage the top of said first mentioned plunger, in order to form an exhaust aperture through said base.

11. Apparatus for making bases for electrical devices comprising an upper mold element for frictionally supporting terminal posts and provided with a generally central apertured extension terminating in a funnel-shaped portion adapted to receive and direct molten glass into said element, and a lower mold element underlying said upper mold element and reciprocable into and out of cooperative relationship with said upper mold element, said lower mold element being formed to receive the molten glass delivered through said upper mold element and confine it against the latter, said lower mold element having apertures registering with said terminal posts to receive leads extending therefrom, and also having a pocket to receive an annular metal member and hold it in place for consolidation with the glass poured thereinto, and reciprocating stripper means to engage the upper ends of said terminal posts for ejecting the formed base from the mold.

12. Apparatus for making bases for electrical devices comprising a lower mold element formed to receive terminal posts, a plunger reciprocable in an aperture in said element into cooperative relationship therewith, said lower mold element also having an annular pocket to receive an annular metal member forming part of the base to be molded, in a position where it surrounds leads extending from said posts, an upper mold element having apertures to receive the upper end portions of said leads, said upper mold element having a generally central aperture, and means reciprocating in said aperture to engage the top of the lower mold plunger in order to form an exhaust aperture through the base being molded, said plunger increasing in diameter above its lower end in order to supplement the contour of the upper mold element and provide the desired upper surface on the base being formed.

13. The method of making an electrical device, comprising supporting a plurality of terminal posts in one of upper and lower mold elements, supporting a metal ring with an outstanding flange on the lower of said mold elements, bringing the other of said mold elements into cooperative relationship with said first mold element with the flange therebetween and inner lead portions from said terminal posts extending through said ring into apertures in said other mold element, introducing a measured quantity of molten glass into the lower of said mold elements, forcing a plunger into said glass until it engages the adjacent surface of the lower of said mold elements, separating the mold elements, withdrawing the formed base, and securing an envelope to said flange to complete the device.

14. The method of making an electrical device, comprising supporting a plurality of terminal posts formed with lead-in conductors extending thereabove in a mold element, bringing a lower mold element carrying a metal base ring into cooperative relationship with said upper mold element with an annular flange of said ring disposed between adjacent surfaces of said elements, and said lead portions extending into apertures in said lower mold element, introducing a measured quantity of molten glass into the lower mold element through an aperture in said upper mold element, forcing a plunger into said glass until it engages the adjacent surface of the lower mold element, forcing an associated hollow plunger into the upper surface of said glass to form a socket for the reception of an exhaust tube, lowering said lower mold element into a stripping device in order to withdraw the formed base from the upper mold element and separate it from said lower mold element, mounting electrodes on said leads and an anode on said ring, enclosing said electrodes and anode in an envelope by sealing the edge thereof to said ring, exhausting said envelope through an aperture in said base, and sealing the apertured portion of said base.

15. Apparatus for making bases for electrical devices comprising upper and lower mold elements, one of said elements having apertures for frictionally gripping lead-in conductors and the other having registering apertures through which the other end portions of said lead-in conductors extend, the lower of said mold elements being formed to receive molten glass, and a plunger reciprocable in said upper mold element through such molten glass into engagement with said lower mold element to form exhausting apertures through such bases.

16. Apparatus for making bases for electrical devices comprising upper and lower mold elements, one of said elements having apertures for frictionally holding lead-in conductors and the other having registering apertures through which the other end portions of said conductors extend, the lower of said mold elements being formed to receive molten glass, a plunger reciprocable in said upper mold element to form exhausting apertures through bases produced in said mold elements, and means for directing a stream of molten glass to fill said lower mold element to the desired extent.

17. Apparatus for making bases for electrical devices, comprising upper and lower mold elements, said upper mold element having apertures for frictionally gripping lead-in conductors, and another aperture through which a stream of molten glass may be introduced, said lower mold element being reciprocable into and out of cooperative relationship with said upper mold element and formed to receive such molten glass and confine it against the upper mold element, said lower mold element also having registering apertures into which the other end portions of said lead-in conductors normally extend, and plunger means reciprocable in the glass-receiving aperture of said upper mold element in order to form exhausting apertures in such bases.

18. Apparatus for making bases for electrical devices, comprising an upper mold element, apertures in said upper mold element for frictionally holding lead-in conductors, said upper mold element having means to receive and direct molten glass thereinto, and a lower mold element underlying said upper mold element and reciprocable into and out of cooperative relationship with said upper mold element, said lower mold element being formed to receive the molten glass delivered through said upper mold element, and confine it against the latter, said lower mold element having apertures registering with the lead-in conductor apertures in said upper mold element to receive the lower portions of said conductors, and also having a pocket to receive an annular member and hold it in place for consolidation with the glass poured thereinto.

19. Apparatus for making bases for electrical devices, comprising upper and lower mold elements, one of said elements having apertures for frictionally gripping lead-in conductors and the other having registering apertures through which the other end portions of said lead-in conductors extend, the lower of said mold elements being formed to receive molten glass, a plunger reciprocable in said upper mold element through such molten glass into engagement with said lower mold element to form exhausting apertures through such bases, and stripper elements reciprocable in said lead-in conductor gripping apertures to eject bases formed in said apparatus.

20. The method of making a base for an electrical device comprising supporting a plurality of terminal posts with associated leads in one of upper and lower mold elements, supporting a metal ring on said lower mold element, introducing a measured quantity of molten glass into said lower mold element so that intermediate portions of said leads and inner portions of said posts are embedded therein, bringing said mold elements together so that a flange of said ring is engaged by said upper mold element and said leads extend into apertures in the mold element cooperating with that which supports said posts, forcing a plunger through the upper mold element and into the glass until it engages an aligned part of said lower mold element and forms an exhaust aperture, allowing the glass to harden, and pushing said posts from the supporting mold element to remove the formed base therefrom.

21. The method of making a base for an electrical device comprising frictionally mounting terminal posts with associated leads in one of upper and lower mold elements, so that said leads extend toward the other of said mold elements for reception in apertures therein during the molding operation, pouring molten glass into said lower mold element so that it surrounds inner portions of said terminal posts and adjacent portions of said leads, reciprocating one of said mold elements until it takes a cooperative position with respect to the other mold element for molding said molten glass therebetween, allowing said glass to harden, and ejecting the base so formed from said mold by the application of pressure to the outer end portions of said terminal posts.

22. The method of making a base for an electrical device comprising supporting a plurality of terminal posts with associated leads in one of upper and lower mold elements, introducing a measured quantity of molten glass into said lower mold element so that intermediate portions of said leads and inner portions of said posts are embedded therein, bringing said mold elements together so that said leads extend into apertures in the mold element cooperating with that which supports said posts, forcing a plunger through the upper mold element and into the glass until it engages an aligned part of said lower mold element and forms an exhaust aperture, allowing the glass to harden, and removing the formed base.

23. The method of making a base for an electrical device comprising frictionally mounting terminal posts with associated leads in one of upper and lower mold elements, so that said leads extend toward the other of said mold elements for reception in apertures therein during the molding operation, pouring molten glass into said lower mold element so that it surrounds inner portions of said terminal posts and adjacent portions of said leads, bringing mold elements together for molding said molten glass therebetween, allowing said glass to harden, and ejecting the base so formed.

HARRY D. MADDEN.
JAMES W. GREENBOWE.